United States Patent
Racicot et al.

(10) Patent No.: US 7,244,457 B2
(45) Date of Patent: Jul. 17, 2007

(54) FOOD PRODUCTS OF REDUCED DENSITY AND INCREASED PERCEIVED SWEETNESS AND PROCESS OF PRODUCTION

(75) Inventors: William F. Racicot, Deer Park, IL (US); Marcus H. Parsons, Crystal Lake, IL (US)

(73) Assignee: Quaker Oats Company, Chicago, IL (US)

( * ) Notice: Subject to any disclaimer, the term of this patent is extended or adjusted under 35 U.S.C. 154(b) by 115 days.

(21) Appl. No.: 10/318,944

(22) Filed: Dec. 13, 2002

(65) Prior Publication Data

US 2004/0115313 A1 Jun. 17, 2004

(51) Int. Cl.
  *A23L 1/164* (2006.01)
(52) U.S. Cl. .................. 426/96; 426/103; 426/620
(58) Field of Classification Search .............. 426/96, 426/103, 620
  See application file for complete search history.

(56) References Cited

U.S. PATENT DOCUMENTS

| | | | |
|---|---|---|---|
| 2,954,296 A * | 9/1960 | Clausi et al. ............... 426/559 |
| 4,211,800 A | 7/1980 | Scharschmidt et al. | |
| 4,767,631 A | 8/1988 | Calandro et al. | |
| 4,859,477 A | 8/1989 | Augustine et al. | |
| 4,880,645 A | 11/1989 | Carpenter et al. | |
| 5,413,805 A | 5/1995 | Delpierre, III et al. | |
| 5,709,902 A | 1/1998 | Bartolomei et al. | |
| RE36,067 E * | 1/1999 | Ringe et al. ............... 426/560 |
| 6,174,553 B1 | 1/2001 | Cerda et al. | |
| 6,183,788 B1 * | 2/2001 | Leusner ..................... 426/96 |
| 2002/0039608 A1 * | 4/2002 | Sirohi et al. ................. 426/94 |
| 2002/0044993 A1 | 4/2002 | Hansa | |

OTHER PUBLICATIONS

English Abstract of JP 2637602 Aug. 6, 1997.
English Abstract of JP 2804872 Sep. 30, 1998.
English Abstract of JP 3157036 Apr. 16, 2001.

* cited by examiner

Primary Examiner—Helen Pratt
(74) Attorney, Agent, or Firm—Banner & Witcoff, Ltd.

(57) ABSTRACT

Food products and methods of production, specifically RTE cereals of reduced density and enhanced perceived sweetness and methods of production are provided. The present invention relates to RTE cereals of reduced density and enhanced perceived sweetness without increasing the amount of total sugar of the cereal piece. By reducing the amount of sugar in the base cereal mix and adding a substantially equivalent amount as a coating, the cereal piece exhibits reduced density and enhanced perceived sweetness.

19 Claims, No Drawings

FOOD PRODUCTS OF REDUCED DENSITY AND INCREASED PERCEIVED SWEETNESS AND PROCESS OF PRODUCTION

BACKGROUND OF THE INVENTION

The present invention relates to ready-to-eat (RTE) cereal products. More specifically, the present invention relates to an RTE cereal of reduced density and enhanced perceived sweetness and methods of production. The invention can also find useful application in other foods, especially those which are provided as a collection of individual pieces.

RTE cereals come in a wide variety of classes. Among these classes are puffed or unpuffed, and frosted (e.g., sugar coated) or unfrosted. Similarly, RTE cereals are prepared from a variety of different base cereal mixes. The most common ingredients include grain flour, salt and sugar or other sweeteners. The grain flour usually comes from wheat, corn, oats, barley, and rye. A variety of sugars and other sweeteners are used in the preparation of almost all RTE cereals to impart sweetness to the finished cereal product. Additional flavor may be imparted depending on the particular sweetener used. Brown sugar for example provides a different flavor than refined or processed sugar. In addition, the amount of sugar can also vary greatly with some cereals containing less than 10% and others containing over 40% sugar by weight. While many cereals have all the sugar incorporated into the base cereal mix, some RTE cereals add sugar as a coating in addition to any sugar contained in the base cereal mix.

Typical unfrosted cereals of the type of interest to this invention are made from a base cereal mix containing about 75% by weight of flour, about 14% by weight of processed white sugar/brown sugar mix, and lesser quantities of other ingredients such as maltodextrin, salt, vitamins, minerals, colors and preservatives. These dry ingredients are metered into an extruder along with some water. Typically, the dry ingredients and water are mixed in the extruder, thereby forming a dough. The ensuing dough is extruded at high pressure to form an expanded rope of cereal which is then cut into pieces. The pieces are then dried in a continuous oven and packaged.

Most consumers enjoy cereals with a sweetened flavor; however there are disadvantages to making cereals with too much sugar or artificial sweeteners. First, consumers are more health conscious and try to avoid refined sugars and other simple carbohydrates. In addition, consumers are mindful of avoiding excess calories. Furthermore, highly sweetened cereals have a negative connotation as being children's cereal. Lastly, base cereal mixes that contain large amounts of sugar or artificial sweetener have been found to cause the resulting cereal piece to be undesirably dense. The problem with reducing or eliminating sugar entirely is that the resulting RTE cereal has a very bland flavor and most consumers do not want to take the time and trouble to add their own sugar to the cereal.

In order to provide a pleasingly sweet RTE cereal and yet satisfy the concerns of these consumers, some manufacturers use artificial sweeteners instead of sugar to sweeten the cereal. While the use of artificial sweeteners solves the problem of consuming excess calories, long-term artificial sweetener use may have other deleterious effects on health. In addition, the use of artificial sweeteners may not resolve the problem of undesirably dense cereal pieces.

The invention addresses these matters and determines it is advantageous to produce an RTE cereal with increased perceived sweetness without increasing the amount of sugar. Furthermore, the invention recognizes it would also be desirable to produce a less dense RTE cereal without having to reduce total sugar. Moreover, the invention recognizes it would be highly advantageous to produce an RTE cereal with reduced density and enhanced perceived sweetness while keeping the total amount of sugar substantially unchanged.

It has been determined that by reducing the amount of sugar in the base cereal mix by a certain amount and by adding an approximately equal amount of sugar as a coating, an RTE cereal with reduced density and enhanced perceived sweetness is produced without having to increase the total amount of sugar in the cereal piece.

SUMMARY OF THE INVENTION

The present invention relates to ready-to-eat (RTE) cereals of reduced density and enhanced perceived sweetness. Additionally, the present invention encompasses the process of making such ready-to-eat cereals of reduced density and enhanced perceived sweetness. The invention can also find useful application in other foods, especially those which are provided as a collection of individual pieces. By reducing the quantity of sugar from the base cereal mix by a certain amount and then adding an essentially equivalent amount of sugar through a coating process, an RTE cereal of reduced density and enhanced perceived sweetness is created. The RTE cereal of the present invention achieves an enhanced level of perceived sweetness even though the total quantity of sugar (sugar in the mix and sugar from the coating process) can be essentially the same as an RTE cereal which has all its sugar present only in the base cereal mix or cereal dough. Furthermore, the density of the cereal piece is reduced.

The present invention also concerns a method for the production of reduced density RTE cereals with enhanced perceived sweetness. It has been determined that a reduced density RTE cereal with enhanced perceived sweetness can be produced without needing to increase the total sugar level. This includes reducing the amount of sugar in the base cereal mix and adding a coating which typically has a substantially equivalent amount of sugar as the amount of sugar withheld from the base cereal mix. The preferred method comprises preparing a base cereal mix, and metering the base cereal mix and water into an extruder to create a dough. Extruding the dough typically is carried out at high pressure, followed by cutting the dough to form cereal pieces. A sweetening composition is applied to the formed cereal pieces, and the coated or frosted cereal pieces are dried in a continuous oven.

The reduced density RTE cereal with enhanced perceived sweetness comprises cereal pieces formed from a base cereal mix that has had its sugar component reduced by a selected amount, a sugar coating formed on the cereal piece which adds an amount of sugar which can be substantially equivalent to the amount of sugar withheld from the base cereal mix. The RTE cereal of the present invention and produced from the above method comprises a base cereal mix, water and a coating solution. Mostly dry ingredients are combined to form the base cereal mix. Water is then added to create dough. The dough is then formed into cereal pieces which are then coated by a sweetening composition. The coated cereal pieces are then dried typically in a continuous oven. In the case of other food products, the food pieces would be produced from a base food mix using similar ingredients and amounts.

The base cereal mix comprises from about 40 to 100% by weight of grain flour and from about 0 to 12% by weight of a sweetener, based on the total weight of the base cereal mix. The sweetening composition comprises from about 65 to 78% by weight of a sweetener and from about 20 to 35% by weight of water, based on the total weight of the sweetening composition. The sweetening composition is applied to the formed cereal pieces, which have a density of less than about 800 grams per liter, so that cereal pieces include from 2 to 12% by weight of the sweetener as a coating or frosting. In addition, after the cereal pieces have been coated, preferably they are dried to a moisture content of about 2 to 5% by weight.

The base cereal mix may also contain supplemental cereal ingredients including, but not limited to, maltodextrin, malted barley extract, molasses, calcium carbonate, sodium bicarbonate, salt artificial color, flavorings, and vitamins. These ingredients may be present in an amount ranging from about 0 to 35% by weight.

DETAILED DESCRIPTION OF THE INVENTION

The present invention concerns both a reduced density RTE cereal with enhanced perceived sweetness and the method of its preparation. The terms "reduced density" and "enhanced perceived sweetness" are relative terms describing certain cereal piece attributes. These desirable characteristics of the present invention are evident when compared to a non-coated or uncoated RTE cereal, which contains substantially the same amount of total sugar, in other words, an RTE cereal that has the sugar present strictly in the base cereal mix.

In order to provide context, the RTE cereal of the present invention will be compared to a typical non-coated RTE cereal. By modifying this typical non-coated RTE cereal according to the method of the present invention, one embodiment of a reduced density RTE cereal with enhanced perceived sweetness will be produced even though both cereals contain substantially the same amount of total sugar.

A typical non-coated cereal used to compare the advantageous characteristics of the present invention comprises a base cereal mix and water.

The base cereal mix of the comparative typical non-coated cereal includes about 76% by weight (weight percent) of flour, about 12.5 weight percent sugar, about 1.3 weight percent brown sugar, about 1.4 weight percent molasses, the remainder being other traditional dry cereal components such as maltodextrin. The base cereal mix and the water are combined or metered into an extruder. A dough is created and extruded at high pressure to form an expanded rope which is then cut into cereal pieces. The pieces are then dried in a continuous oven until the moisture content is about 2 to 5% by weight.

With such a typical non-coated cereal, the total sugar content in the base cereal mix is about 14 weighs percent. The density of the cereal pieces before drying is on the order of about 825 grams per liter. This and other density measurements noted herein are made according to a typical RTE cereal approach by which, after leaving the extruder and cutter and slightly cooling, the weight of cereal accommodated by a carton of known volume is measured and reported as grams per liter.

When used herein, substantially the same amount of sugar means that the difference between the percentages of total sugar by weight between the two cereals is less than 3%. This is based largely upon the recognition by work reported herein of the difficulty of typical consumers to detect sweetness differences in coated cereals when the difference in the amount of sugar as a coating is less than about 3% by weight. For example coated cereal formulations according to the invention can have substantially the same perceived amount sugar (sweetness) whether having from 6% by weight of sugar as a coating to 8% by weight of sugar as a coating.

The density is measured as noted above and is reported in terms of grams per liter. By the term "reduced density", it is meant the change in density is at least about 5 percent when comparing cereals of equal total sugar content. As an example, a typical non-coated cereal as described above has a density in the range of from about 800 to 850 grams per liter, whereas the coated RTE cereal of the present invention has a density of from about 700 to 750 grams per liter.

The RTE cereal of reduced density and enhanced perceived sweetness of the present invention comprises a base cereal mix, water and a sweetening composition. Similarly, other food products include these same constituents except instead of a base cereal mix a base food mix is provided. The base cereal mix has a reduced amount of sweetener as compared to the typical non-coated cereal. The sweetening composition is then applied to from a sweet coating.

Many terms are known in the art to describe the composition used to add a topical sweetener to cereals. Terms used in the art include pre-sweetener coating composition, sugar slurry, coating solution, coating syrup, sugar syrup as well as others. The term sweetening composition as used herein is meant to encompass all such other terms known in the art.

In addition, many methods are known in the art for applying a topical sweetener to cereals. The term "coating" is not meant to limit the invention to a particular method, just as the term "coated" is not meant to limit the invention to a particular type of coated cereal piece. These terms are meant to include methods which may not totally cover the cereal piece with a sweetener and cereal pieces that may not be totally covered such as is the case with cereals which are frosted on only one side and their methods of production.

In a preferred embodiment, the amount of sugar added as a coating is substantially equal to the difference in the amount of sugar in the respective base cereal mixes between typical non-coated cereals and the preferred embodiment. Accordingly, the total amount of sweetener in the cereal according to this preferred embodiment is substantially the same as in the uncoated cereal, but the RTE cereal of the present invention has reduced density and enhanced perceived sweetness when compared to the uncoated cereal.

The base cereal mix includes from about 40 to 100% by weight of grain flour, preferably from about 50 to 95%, more preferably from about 63 to 89%, based on the total weight of the base mix. The grain flour can be produced from one or a mixture of more than one grain selected from the group including, but not-limited to, wheat, corn, rice, oats, barley, and rye. For example, the grain flour can be a mixture of about 40 to 100% by weight of oat flour and about 0 to 60% by weight of whole-wheat flour, preferably from about 44 to 75% by weight of oat flour and from about 10 to 45% by weight of whole-wheat flour, and more preferably about 48 to 62% by weight of oat flour and about 15 to 27% by weight of whole-wheat flour, based on the total weight of the base mix.

In addition, a sweetener is preferably included in the base cereal mix. The sweetener is present from 0 to 12% by weight, preferably from 5 to 10% by weight, based upon the total weight of the base mix. Examples of sweeteners include but are not limited to refined sugar, brown sugar, sucrose, and other known sources of natural sugars. The preferred sweetener is a mixture of from about 0 to 5% by weight of brown sugar and from about 0 to 12% by weight of refined sugar (typically white sugar), preferably from about 0 to 3.5% by weight of brown sugar and from about 2.5 to 11% by weight of refined sugar, more preferably from about 0 to 2.5% by weight of brown sugar and from about 5 to 10% by weight of refined sugar, based on the total weight of the base cereal mix. The amount of sugar just referred to does account for any sugar which may be naturally present in the grain flour or any other constituent. The amount of sugar refers to the amount added as a sugar to create the base mix.

The base cereal mix may also contain supplemental cereal ingredients including, but not limited to, maltodextrin, malted barley extract, molasses, calcium carbonate, sodium bicarbonate, salt, artificial color, and vitamins. These ingredients may be present in an amount ranging from about 0 to 35% by weight, based on the total weight of the base cereal mix. If maltodextrin is used, the base cereal mix can include from about 0 to 10% by weight of maltodextrin, based on the total weight of the base cereal mix. In addition, if included, the base cereal mix can include from about 0 to 5% by weight of malted barley extract and from about 0 to 0.3% of vitamin premix, based on the total weight of the base cereal mix.

Water which is added into the extruder along with the base cereal mix. If desired, some of the dry ingredients in the base cereal mix can be included in the water phase before it is mixed into the base cereal mix. The ingredients that could be included in the water phase instead of being added directly into the base cereal mix include sweetening syrups such as the molasses, vitamins, artificial colors and flavors, if any of these ingredients are used at all. The amount of water used is not critical and depends largely on the extruder settings since most of the water is lost as steam when the dough is cooked as it passes through the extruder. All that is required is an amount of water sufficient to form a dough when mixed with the base cereal mix as is known to those skilled in the art. In most formulations, the extruded cereal piece typically is dried to a moisture content of about 2 to 5% by weight, based on the weight of the finished cereal piece, and the amount of water will be adequate to provide this water content after such drying.

The sweetening composition applied to the cereal pieces comprises from about 20 to 35% by weight of water and from about 65 to 78% by weight of a sweetener, preferably from about 22 to 33% by weight of water and from about 67 to 77% by weight of a sweetener, more preferably from about 25 to 30% by weight of water and from about 70 to 75% by weight of brown sugar, based on the total weight of the sweetening composition. The sweetening composition may also include from about 0 to 2% by weight of flavorings, based on the total weight of the sweetening composition.

The sweetening composition is applied to the cereal pieces so that the sweetener applied as a coating or frosting comprises from about 2 to 12% by weight of the coated cereal pieces. In other embodiments, the sweetening composition is applied to the cereal pieces so that the sweetener as a coating comprises from about 5 to 9% by weight of the coated cereal pieces and still other embodiments from about 6 to 7% by weight of the sweetener as a coating, based on the total weight of the coated cereal pieces.

In preparing the coated RTE cereal according to the invention, the base cereal mix and water typically are charged into an extruder. A dough is created which is extruded at high pressure. The extrudate can take many forms depending on the extruder settings and the dies used. Preferably, the dough is extruded at high pressure to form an expanded rope. A cutter then cuts this rope into many pieces. The sweetening composition is then applied to the cereal pieces. The preferred method of applying a sweetener to the cereal pieces comprises transferring the cereal pieces to a rotary coater where the sweetening composition is added. However other suitable coating methods and equipment, such as dipping, sheeting or spray application, can be used. The coated or frosted pieces are then dried, such as in a continuous oven.

The amount of sweetener added as a coating can be varied depending on the coating method used. In the preferred embodiment, the amount of sweetener added as a coating can be varied by changing (increasing or decreasing) the amount of coating solution used relative to the amount of cereal placed in the rotary coater. Generally speaking, this will vary the thickness of the coating on each piece.

In order to demonstrate the advantages of the coated RTE cereal of the present invention, the following non-limiting Examples are provided.

EXAMPLE 1

This Example includes comparing a preferred embodiment to a typical non-coated RTE cereal. In addition, other examples are included in the comparison.

The base cereal mix formulation of the typical non-coated cereal is labeled as uncoated formula and the base cereal mix formulation of the preferred embodiment is labeled as coated formula 8E. Each is reported in Table I as a weight percent of the base mix.

TABLE I

| INGREDIENT | UNCOATED FORMULA % BY WEIGHT | COATED FORMULA 8E % BY WEIGHT |
|---|---|---|
| Grain Flour | 75.8 | 80.8 |
| Brown Sugar | 1.3 | 1.3 |
| Sugar | 12.6 | 7.5 |
| Molasses | 1.4 | 1.4 |

Each formulation also contained other cereal components in traditional quantities. These components were salt, maltodextrin, malted barley extract, calcium carbonate, sodium bicarbonate, artificial color, and a vitamin premix.

Additional coated formulations, labeled as 11D, 13E and 13J, were prepared using the same base mix as coated formula 8E. These were prepared to determine the effects of altering the sweetening composition. Since the uncoated formula indicated above represents a typical non-coated RTE cereal, it did not undergo any coating. The sweetening compositions used on formulations 8E, 11D, 13E, and 13J are shown in Table II.

TABLE II

| INGREDIENT | 8E % BY WEIGHT | 11D % BY WEIGHT | 13E % BY WEIGHT | 13J % BY WEIGHT |
|---|---|---|---|---|
| Brown Sugar | 73.0 | 73.0 | 73.0 | 73.0 |
| Brown Sugar Flavor | 0 | 0.5 | 1.0 | 1.0 |
| Water | 27.0 | 26.5 | 26.0 | 26.0 |

The base mix was metered into an extruder along with some water. Dough was formed and extruded at high pressure to form an expanded rope which was then cut into pieces. The cereal pieces were then transferred to a rotary coater and the sweetening composition shown above was added. In order to coat the cereal pieces with a specific amount of sugar, the sweetening composition and cereal pieces were added in the proportions shown in Table III.

TABLE III

| COMPONENT | 8E<br>% BY WEIGHT | 11D and 13E<br>% BY WEIGHT | 13J<br>% BY WEIGHT |
|---|---|---|---|
| Cereal Piece | 92 | 89 | 86 |
| Sweetening Composition | 8 | 11 | 14 |

Density measurements were taken after the cereal was cut into pieces and cooled slightly upon exiting the extruder. The density of the cereal produced using the uncoated, prior formulation was measured at 826 grams per liter. The density of coated cereal 8E was measured at 725 grams per liter, a reduction of over 12%. After the cereal pieces were coated, they were dried in a continuous oven to a moisture content of 2 to 5%.

The sugar content of all the formulations was as follows. The information shown in Table TV however, also accounted for any sugar present in the grain flours.

TABLE IV

| SUGAR CONTENT | UNCOATED FORMULA<br>% BY WEIGHT | 8E<br>% BY WEIGHT | 11D and 13E<br>% BY WEIGHT | 13J<br>% BY WEIGHT |
|---|---|---|---|---|
| Base Cereal Mix | 15.4 | 9.5 | 9.3 | 9.1 |
| Coating | 0 | 6.3 | 8.7 | 11.1 |
| Total | 15.4 | 15.8 | 18.0 | 20.2 |

As can be seen, the total sugar content of the uncoated formula and of at least the coated formula 8E are substantially the same, and yet the density has been reduced by over 12%. In addition, as indicated in Example 2, the perceived sweetness of at least the 8E formula is enhanced over the uncoated formulation.

EXAMPLE 2

One hundred individuals taste tested the five formulations of Example 1 in milk. Fifty of the individuals were classified as heavy users because they had purchased five or more cartons per year of a non-coated biscuit type cereal. The remaining fifty individuals were simply categorized as biscuit type RTE cereal users. The results of the sweetness perception are indicated in Table V. Significant differences between the products at the 95% confidence level are noted by a capital letter (besides the product with the higher score) identifying each cereal product with which there is such a significant difference. Directional differences between the cereal products at the 90% confidence level are noted in the same manner, but by a lower case letter.

TABLE V

| Sweetness Perception | A<br>UNCOATED FORMULA<br>Number of Individuals | B<br>8E<br>FORMULA<br>Number of Individuals | C<br>11D<br>FORMULA<br>Number of Individuals | D<br>13F<br>FORMULA<br>Number of Individuals | E<br>13J<br>FORMULA<br>Number of Individuals |
|---|---|---|---|---|---|
| Too Sweet | 2 | 8 | 10 | 11 | 14 (A) |
| Just Right | 35 | 44 | 50 (a) | 58 (A) | 62 (Ab) |
| Not Enough | 63 (EDCB) | 48 (Ed) | 40 (E) | 31 | 24 |

As the results indicate, the number of individuals responding that the uncoated formula cereal product was not sweet enough decreased significantly in cereal product 8E. This demonstrates that cereal product 8E has enhanced perceived sweetness compared to the uncoated product, even though the total sugar content is substantially the same. These results demonstrate that cereal of the present invention has enhanced perceived sweetness, as well as reduced density as noted in Example 1.

The individuals were also asked to classify the cereals. The overall results are shown in Table VT, and the results of the individuals classified as heavy users are shown in Table VII.

TABLE VI

|  | Uncoated Formula | 8E | 11D | 13F | 13J |
|---|---|---|---|---|---|
| Highly Sweetened | 0% | 5% | 5% | 8% | 9% |
| Moderately Sweetened | 8% | 17% | 29% | 31% | 38% |
| Lightly Sweetened | 37% | 47% | 35% | 36% | 36% |
| Barely Sweetened | 35% | 23% | 26% | 19% | 13% |
| Not Sweetened at All | 20% | 8% | 5% | 6% | 4% |

TABLE VII

|  | Uncoated Formula | 8E | 11D | 13F | 13J |
|---|---|---|---|---|---|
| Highly Sweetened | 0% | 6% | 8% | 12% | 8% |
| Moderately Sweetened | 6% | 18% | 34% | 30% | 38% |
| Lightly Sweetened | 42% | 52% | 36% | 32% | 32% |
| Barely Sweetened | 34% | 14% | 18% | 18% | 16% |
| Not Sweetened at All | 18% | 10% | 4% | 8% | 6% |

These results further reinforce that advantage of enhanced perceived sweetness of the present invention The number of individuals classifying the cereals as barely sweetened or not sweetened at all decreases when comparing the control to the other cereal formulations. In addition, the numbers increase in the lightly, moderately and highly sweetened categories when comparing the control to the other formulations, with formulation 8E receiving the highest response in the lightly sweetened category.

The examples and embodiments disclosed above are in no way meant to limit the scope of the present invention. These examples and embodiments are meant to further illustrate the invention, whereas the claims below define the actual scope of the present invention.

The invention claimed is:

1. A ready-to-eat coated cereal, comprising:
   a) a base cereal mix having:
      a grain flour of about 40% to about 100% by weight, based on the total weight of the base cereal mix;
      a first sweetener in an amount of less than about 15.4% by weight, based on the total weight of the base cereal mix; and
   b) a coating having:
      a second sweetener of about 2% to about 12% by weight, based on the total weight of said coated cereal,
   wherein the total amount of said first sweetener and said second sweetener is equal to less than about 15.8% by weight, based on the total weight of the coated cereal, and
   wherein the ready-to-eat coated cereal has a bulk density of between about 700 grams per liter to about 800 grams per liter,
   the ready-to-eat coated cereal providing an enhanced perceived sweetness over the ready-to-eat non-coated cereal containing substantially the same amount of sweetener.

2. The ready-to-eat coated cereal of claim 1, wherein said grain flour is selected from the group consisting of wheat flour, oat flour, corn flour, rice flour, barley flour, rye flour and combinations thereof.

3. The ready-to-eat coated cereal of claim 1, wherein said grain flour comprises from about 40% to about 65% by weight of oat flour and from about 0% to about 30% by weight of whole-wheat flour, based on the total weight of the base cereal mix.

4. The ready-to-eat coated cereal of claim 1, wherein said grain flour comprises from about 50% to about 62% by weight of oat flour and from about 20% to about 27% by weight of whole-wheat flour, based on the total weight of the base cereal mix.

5. The ready-to-eat coated cereal of claim 1, wherein said first sweetener is selected from the group consisting of refined sugar, white sugar, brown sugar and combinations thereof.

6. The ready-to-eat coated cereal of claim 1, wherein said first sweetener is in the amount of about 0% to 12% by weight, based on the total weight of the base cereal mix.

7. The ready-to-eat coated cereal of claim 1, wherein said second sweetener is selected from the group consisting of refined sugar, white sugar, brown sugar and combinations thereof.

8. The ready-to-eat coated cereal of claim 1, wherein said coating comprises from about 5 to about 9% by weight of the second sweetener, based on the total weight of the coated cereal.

9. The ready-to-eat coated cereal of claim 1, wherein said coating comprises from about 6 to about 7% by weight of the second sweetener based on the total weight of the coated cereal.

10. The ready-to-eat cereal of claim 1, wherein said coated cereal comprises extruded individual cereal pieces.

11. The ready-to-eat cereal of claim 1, wherein said base cereal mix further comprises from about 0% to about 10% by weight of maltodextrin, based on the total weight of the base cereal mix.

12. The ready-to-eat cereal of claim 1, wherein said base cereal mix further comprise from about 0% to about 5% by weight of malted barley extract, based on the total weight of the base cereal mix.

13. The ready-to-eat cereal of claim 1, wherein said base cereal mix further comprises from about 0% to about 0.3% by weight of a vitamin premix, based on the total weight of the base cereal mix.

14. A food product comprising the ready-to-eat coated cereal of claim 1.

15. A method for producing a ready-to-eat coated cereal of reduced bulk density and enhanced perceived sweetness, comprising the steps of:
   i) creating a base cereal mix which includes:
      a) a grain flour of about 40% to about 100% by weight, based on the total weight of the base cereal mix; and
      b) a first sweetener of about 0% to about 12% by weight, based on the total weight of the base cereal mix;
   ii) combining the base cereal mix and water into an extruder to form a stream of individual cereal pieces having a bulk density of between about 700 grams per liter to about 800 grams per liter, the individual pieces formed by extruding a dough and cutting the extruded dough to form the extruded individual cereal pieces; and
   iii) applying a coating to said individual cereal pieces with a second sweetener to provide individual coating cereal pieces, said coating comprising from about 2% to about 12% by weight of said second sweetener, based on the total weight of the coated cereal pieces.

16. The method of claim 15, wherein said second sweetener is selected from the group consisting of refined sugar, white sugar, brown sugar and combinations thereof.

17. The method of claim 15, wherein said coating comprises from about 5% to about 9% by weight of the second sweetener, based on the total weight of the coated cereal pieces.

18. The method of claim 15, wherein said coating comprises from about 6% to about 7% by weight of the second sweetener, based on the total weight of the coated cereal pieces.

19. The method of claim 15, further comprising the step of: iv) drying said coated cereal pieces to a moisture content of about 2% to about 5% by weight.

* * * * *